(12) United States Patent
Huff et al.

(10) Patent No.: US 11,494,712 B1
(45) Date of Patent: Nov. 8, 2022

(54) AUTOMATED PRESENTATION ENGINE AND ASSOCIATED SYSTEM AND METHOD

(71) Applicant: OPAL LABS INC., Portland, OR (US)

(72) Inventors: George M. Huff, Portland, OR (US); David Gorman, Portland, OR (US); Jeff Reynolds, Turner, OR (US); Chris Campbell, Portland, OR (US)

(73) Assignee: OPAL LABS INC., Portland, OR (US)

( * ) Notice: Subject to any disclaimer, the term of this patent is extended or adjusted under 35 U.S.C. 154(b) by 1724 days.

(21) Appl. No.: 15/018,765

(22) Filed: Feb. 8, 2016

Related U.S. Application Data

(60) Provisional application No. 62/113,663, filed on Feb. 9, 2015.

(51) Int. Cl.
| | |
|---|---|
| *G06Q 10/06* | (2012.01) |
| *G06Q 30/02* | (2012.01) |
| *G06T 11/20* | (2006.01) |
| *G06F 3/0489* | (2022.01) |
| *G06F 3/0484* | (2022.01) |
| *G06F 3/0481* | (2022.01) |
| *G06F 40/106* | (2020.01) |
| *G06F 40/134* | (2020.01) |
| *G06F 40/186* | (2020.01) |

(52) U.S. Cl.
CPC ......... *G06Q 10/063* (2013.01); *G06F 3/0481* (2013.01); *G06F 3/0484* (2013.01); *G06F 3/0489* (2013.01); *G06F 40/106* (2020.01); *G06F 40/134* (2020.01); *G06F 40/186* (2020.01); *G06Q 30/0201* (2013.01); *G06T 11/206* (2013.01)

(58) Field of Classification Search
CPC ....................................................... G06F 17/21
USPC ........................................................ 715/202
See application file for complete search history.

(56) References Cited

U.S. PATENT DOCUMENTS

| | | | | |
|---|---|---|---|---|
| 7,769,767 | B2 * | 8/2010 | Petersen | H04L 67/18 |
| | | | | 707/754 |
| 2005/0216431 | A1 * | 9/2005 | Baker | G06F 17/248 |
| 2007/0204217 | A1 * | 8/2007 | Ross | G06F 17/212 |
| | | | | 715/234 |

(Continued)

*Primary Examiner* — Andrew R Dyer
*Assistant Examiner* — Tionna M Burke
(74) *Attorney, Agent, or Firm* — Renaissance IP Law Group, LLP; David A. Crowther

(57) ABSTRACT

Embodiments of the inventive concept include an automated engine to auto-import content from a separate and/or integrated application. A live update of a presentation can be performed based on latest data from a separate and/or integrated application. A presentation engine can generate a link for viewing a presentation can be shared without the need to have any corresponding separate client-side program installed on a user station. Raw digital input content can be sourced from a separate and/or integrated application, or from a 3rd-party database, and imported into the presentation engine. The presentation engine can automatically produce an auto-formatted presentation based on the raw digital content. The digital content can include a marketing and/or branding plan. The presentation engine can perform a live update to the presentation as the plan changes. The presentation can be viewed in any suitable web browser. Accordingly, marketing and branding plans can be quickly communicated to stakeholders.

13 Claims, 8 Drawing Sheets

(56) References Cited

U.S. PATENT DOCUMENTS

| | | | |
|---|---|---|---|
| 2013/0179239 A1* | 7/2013 | Patel | G06Q 30/0207 |
| | | | 705/14.1 |
| 2013/0198636 A1* | 8/2013 | Kief | G06F 17/2241 |
| | | | 715/730 |
| 2017/0323312 A1* | 11/2017 | Penumaka | G06Q 30/0201 |

* cited by examiner

AUTOMATED PRESENTATION ENGINE AND ASSOCIATED SYSTEM AND METHOD

RELATED APPLICATION DATA

This application claims the benefit of co-owned U.S. Provisional Patent Application Ser. No. 62/113,663, filed Feb. 9, 2015, which is hereby incorporated by reference.

TECHNICAL FIELD

This application pertains to a presentation engine, and more particularly, to an automated presentation engine and associated system and method for processing and formatting raw branding and marketing data into a sharable and presentable formatted structure.

BACKGROUND

The lifeblood of many companies revolves around a strong branding strategy. Building a branding strategy can be a complex undertaking, particularly in view of the vast number of information outlets such as television broadcast, radio broadcast, print, and online channels including email, company websites, social media, FACEBOOK®, TWITTER®, mobile applications, and the like. To plan for, execute, summarize, and present marketing and branding strategies in the present-day requires the use of computerized tools. But the conventional tools are inadequate to handle the complexity of modern branding strategies, and lack the automation necessary to process and present such information in a time-effective and cohesive fashion. Current tools such as MICROSOFT® PowerPoint and APPLE® Keynote are well-suited for certain applications that involve essentially manual processes for building presentations from available data, but such tools are inadequate for the high-level automated construction of presentation materials that embody an entire marketing or branding strategy.

Accordingly, a need remains for improved methods and systems for automating the generation of presentation materials that are based from complex data sets. Embodiments of the invention address these and other limitations in the prior art.

Figure 1:
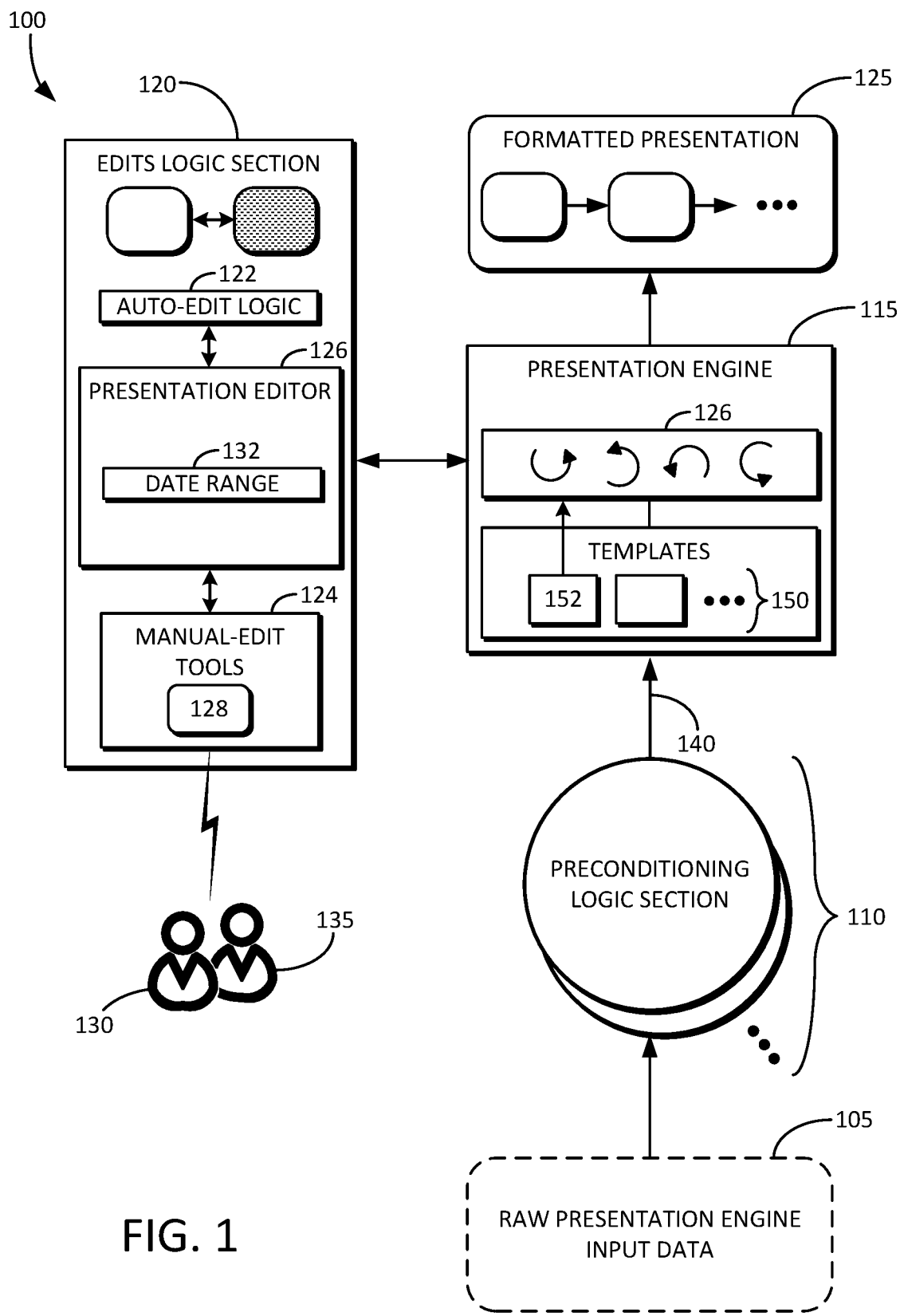
FIG. 1 illustrates an example block diagram of an example auto-formatted presentation generation system for automatically processing and formatting presentation engine input data into a sharable, formatted presentation in accordance with various embodiments of the inventive concept.

The foregoing and other features of the various embodiments of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a data set could be termed a second data set, and, similarly, a second data set could be termed a first data set, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the inventive concept include an automated engine configured to auto-import content from a separate and/or integrated application. Embodiments of the inventive concept provide a mechanism for auto-formatting of content. Embodiments of the inventive concept include a mechanism to perform a live update of a presentation based on latest data from a separate and/or integrated application. Embodiments of the inventive concept include a mechanism for sharing a link for viewing a presentation without the need to have any corresponding separate client-side program installed on a user station. Embodiments of the inventive concept include a mechanism for selecting a source of digital content from a separate and/or integrated application. Embodiments of the inventive concept include a mechanism for selecting a source of digital content from a 3rd-party database. The selected digital content can be exported to a presentation engine, which can automatically produce a slide presentation based on the digital content. The digital content can include a marketing and/or branding plan. The presentation engine can perform a live update to the presentation as the plan changes. The presentation can be viewed in any suitable web browser. Accordingly, marketing and branding plans can be quickly communicated to internal and/or external stakeholders, so that approvals can be obtained to proceed with the corresponding plans.

FIG. 1 illustrates a block diagram of an example auto-formatted presentation generation system 100 for automatically processing and formatting raw presentation engine input data 105 into a sharable, formatted presentation 125 in accordance with various embodiments of the present invention. The system 100 can include a presentation engine 115. The presentation engine 115 can receive the raw input data 105, process the raw input data 105, and automatically generate the formatted presentation 125. The term "raw" as used herein refers to input data having no particular format, size, color, data type, or set of rules with which the input data conforms. In other words, the raw input data 105 can include data having a variety of formats, sizes, colors, data types, rules, or no rules with which the input data conforms. The formatted presentation 125 can include an auto-formatted presentation based on the raw input data 105. For example, the formatted presentation 125 can be a slide presentation, a video presentation, or the like. The auto-formatted presentation can include auto-formatted branding and/or marketing plan information.

The auto-formatted presentation generation system 100 can include one or more preconditioning logic sections 110, which can pre-configure the raw presentation engine input data 105, thereby producing pre-configured branding information 140, which can be imported into the presentation engine 115. For example, the one or more preconditioning logic sections 110 can automatically pre-configure the raw presentation engine input data 105 so that it is arranged in such a way that the presentation engine 115 can automatically transform the pre-configured branding information 140 into an auto-formatted presentation 125. In some embodiments, the auto-formatted presentation 125 can be entirely automatically formatted. In some embodiments, the auto-formatted presentation 125 can be partially auto-formatted and partially manually-formatted. When referring to the "auto-formatted presentation 125" herein, it will be understood that this term can refer to either a fully-auto-formatted presentation 125 or a partially-auto-formatted presentation 125. The pre-configured branding information 140 can include branding or marketing related information.

Each of the one or more preconditioning logic sections 110 can process and pre-configure, for example, a particular format type of the raw presentation engine input data 105. The format types of raw presentation engine input data 105 can include, for example, media content data, analytic data, object data, team data, workflow data, and/or marketing category data, as further described in detail below.

The auto-formatted presentation generation system 100 can include an edits logic section 120. The edits logic section 120 can edit, or cause to be edited, the information received by the presentation engine 115. The edits logic section 120 can automatically edit or update the auto-formatted presentation 125, using auto-edit logic 122 to control a presentation editor 126, based on live or updated information (e.g., 140) received from the one or more preconditioning logic sections 110. In other words, the edits logic section 120 can automatically edit or update, or cause to be edited or updated, the auto-formatted presentation 125 substantially in real time as new configured information (e.g., 140) is received from the one or more preconditioning logic sections 110. In some embodiments, the auto-edit logic section 122 can control or otherwise automatically operate the presentation editor 126. A date range 132 for the auto-formatted presentation 125 can be selected by the user or selected automatically. The date range 132 can cause only pre-configured information (e.g., 140) having timestamps that fall within the date range 132 to be included in the auto-formatted presentation 125.

Alternatively or in addition, the edits logic section 120 can provide manual edit tools section 124 to one or more administrator 130 or one or more users 135 of the system 100 (generally referred to herein as the user 135), so that the information received by the presentation engine 115 can be manually changed, re-arranged, and/or updated. For example, the user 135 can manually change what the auto-edit logic 122 implements. By way of another example, the user 135 can make different edits not performed by the auto-edit logic 122. The user 135 can use the manual-edit tools section 124 to complete or add finishing human touches to the auto-formatted presentation 125. The manual edit tools section 124 can include a user interface 128. The user interface 128 can include, for example, a graphical user interface displayed via a display, a touch screen, or the like, and can interface with the user 135 via a mouse, a keyboard, the touch screen, or the like. In some embodiments, the auto-edit logic 122 can automatically cause the presentation editor 126 to do a first pass of automatic edits, and the manual-edit tools 124 can receive commands from the user 135, via the user interface 128, to perform a second pass of manual edits to the auto-formatted presentation 125.

The auto-formatted presentation 125 can be automatically generated, by the presentation engine 115, according to one or more predefined templates 150. The one or more predefined templates 150 can include, for example, a slide-for-every-moment format, a storyboard view format, a data visualization view format, and/or an analytics page, or the like. The user (e.g., 135) can select a template 152 for the presentation 125 from among the one or more predefined templates 150. Alternatively, the presentation engine 115 can automatically select a template 152 from among the one or more predefined templates 150. For example, the presentation engine 115 can automatically select a template 152 based at least on the pre-configured branding information 140. When the pre-configured branding information 140 conforms well to a particular template 150, then the presentation engine 115 can select the particular template 150 to which the pre-configured branding information 140 conforms well.

The presentation engine 115 can generate the auto-formatted presentation 125 by populating the selected template 152 with the pre-configured branding information 140. The presentation engine 115 can include a population intelligence logic section 126 to determine which portion of the selected template 152 should be populated with which portion of the pre-configured branding information 140, and to populate the selected template 152 until the selected template 152 is substantially populated. In other words, the population intelligence logic section 126 can populate a first portion of the selected template 152 with a first portion of the pre-configured branding information 140, a second portion of the selected template 152 with a second portion of the pre-configured branding information 140, and so forth. The auto-edit logic section 122 can cause the presentation editor 126 to automatically edit the populated selected template 152 within parameters of the selected template 152, such as by resizing or reformatting images, re-arranging content, adding textual descriptors, or the like. The manual-edit tools 124 can be used to further edit the populated selected template 152 with a human touch by receiving edit commands from the user 135 via the user interface 128. The further edits can include, for example, resizing or reformatting images, re-arranging content, adding textual descriptors, or the like, and can cause the presentation editor 126 to edit the auto-formatted presentation within parameters of the selected template 152.

Figure 2:
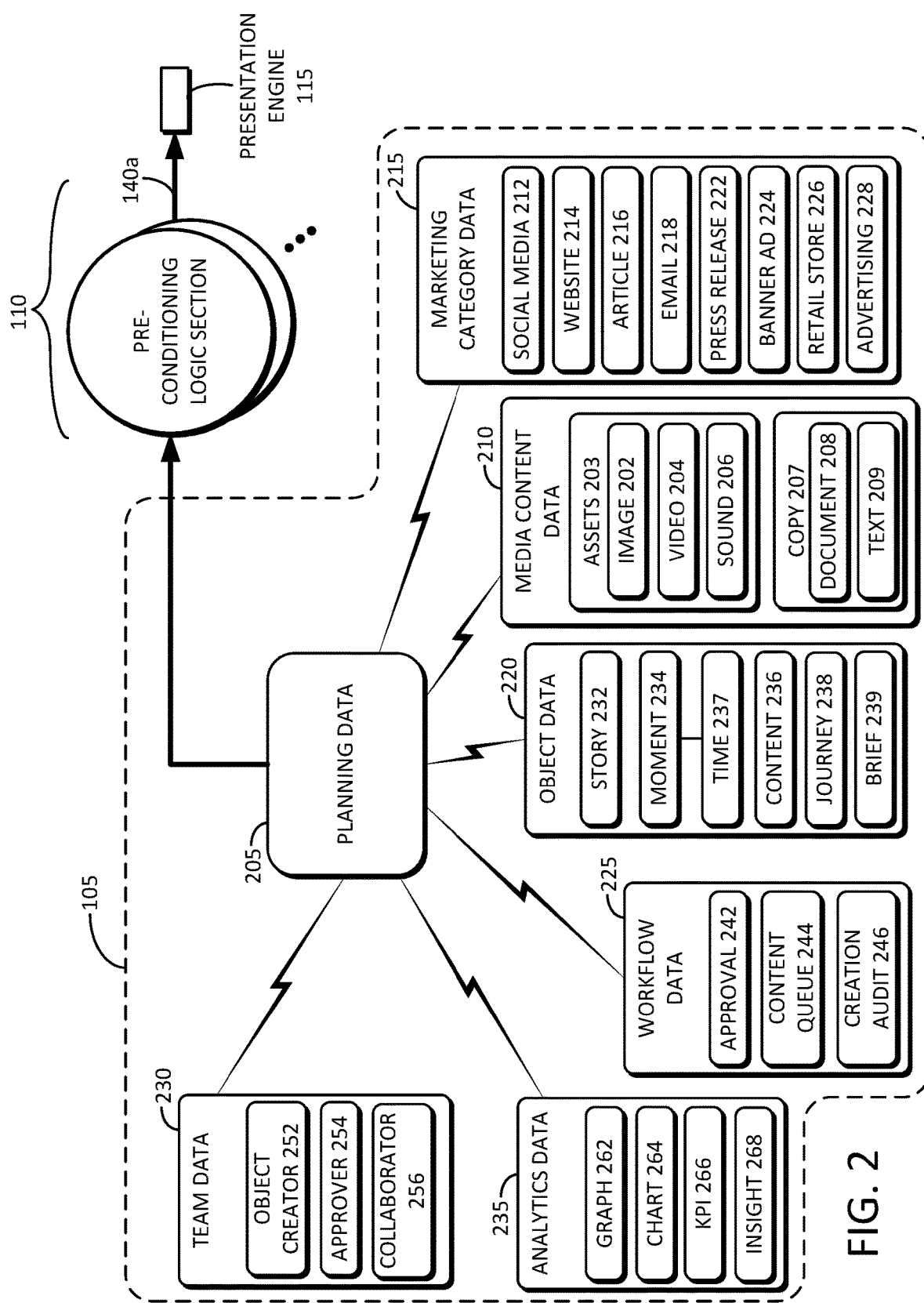
FIG. 2 illustrates an example block diagram of additional details of a portion of the presentation engine input data of FIG. 1, one or more preconditioning logic sections of FIG. 1, and the presentation engine of FIG. 1.

FIG. 2 illustrates an example block diagram of additional details of a portion of the presentation engine input data 105 of FIG. 1. Reference is now made to FIGS. 1 and 2.

The portion of the raw presentation engine input data 105 can include planning data 205. The planning data 205 can include, for example, media content data 210, marketing category data 215, object data 220, workflow data 225, team data 230, and/or analytics data 235.

The media content data 210 can include, for example, media assets 203 and/or media copy 207. The media assets 203 can include, for example, one or more images 202, one or more video clips 204, and/or one or more sound clips 206. The media copy 207 can include, for example, one or more documents 208 and/or one or more text sections 209. The marketing category data 215 can include, for example, one or more social media references 212, one or more websites or links to websites 214, one or more articles 216, one or more emails 218, one or more press releases 222, one or more banner ads 224, retail store information 226, and/or advertising information 228. The object data 220 can include one or more stories 232, one or more moments 234, content 236, and/or one or more journeys 238. A story 232 can include, for example, a series of moments 234, each of which can be associated with a particular slide or section of the auto-formatted presentation 125. Each of the moments 234 can contain various content 236 or "milestones" that can be part of a marketing "tease" about a particular product or service. Each moment 234 can be associated with or targeted to a particular time 237. The particular time 237 can be, for example, associated with a release date. The object data 220 can include a brief 239, which can include a marketing or branding plan tailored to a specific channel such as web, email, or social. The brief 239 can be associated with a particular story 232. The auto-formatted presentation 125 can include some or all of the brief 239 along with certain pieces of content 236 demonstrating how the brief 239 has been translated into the content 236. The impact (e.g., success or fail) of the strategy (i.e., application of the brief 239) can be supported by analytics data (e.g., 235 or $3^{rd}$ party analytics data discussed below).

The workflow data 225 can include one or more approvals 242, one or more content queues 244, and/or one or more creation audits 246. The one or more approvals 242 can be an indicator of whether an individual from among the approvers set forth in the approver data 254, such as a supervisor, stakeholder, manager, or the like, approves the overall marketing or branding strategy, approves of at least one portion of the auto-formatted presentation 125, and/or approves of the entire auto-formatted presentation 125. The one or more content queues 244 and/or the one or more creation audits 246 can assist in the automatic generation of the auto-formatted presentation 125. For example, the one or more content queues 244 can queue different content in the workflow data 225.

The team data 230 can include object creator data 252, approver data 254, and/or collaborator data 256. The team data 230 can include or otherwise represent creative input from individual users, stakeholders, supervisors, managers, and/or other similar collaborators. For example, the object creator data 252 can include information about one or more individuals having a role of creating assets such as images, videos, or the like, and/or individuals having a role of creating copy such as branding content, marketing pieces, textual descriptors, or the like, for inclusion in the auto-formatted presentation 125. By way of another example, the approver data 254 can include information about one or more individuals having the authority to approve at least one portion of the auto-formatted presentation 125 or the entire auto-formatted presentation 125. By way of yet another example, the collaborator data 256 can include information about one or more individuals whose responsibility it is to collaborate in the production of at least one portion of the auto-formatted presentation 125 or the entire auto-formatted presentation 125. Such creative and/or authoritative input can be incorporated into the planning data 205.

The analytics data 235 can include one or more graphs 262, one or more charts 264, one or more key performance indicators (KPIs) 266, and/or one or more insights 268. The analytics data 235 can be automatically collected from the Internet or other networks. The analytics data 235 can be incorporated into the planning data 205 and can influence the generation of the auto-formatted presentation 125.

The one or more preconditioning logic sections 110 can receive, configure, and/or export the planning data 205 to the presentation engine 115 as pre-configured branding information 140a. The presentation engine 115 can receive or otherwise import the pre-configured branding information 140a, and can generate the auto-formatted presentation 125 based at least on the pre-configured branding information 140a received from the one or more preconditioning logic sections 110.

Figure 3:
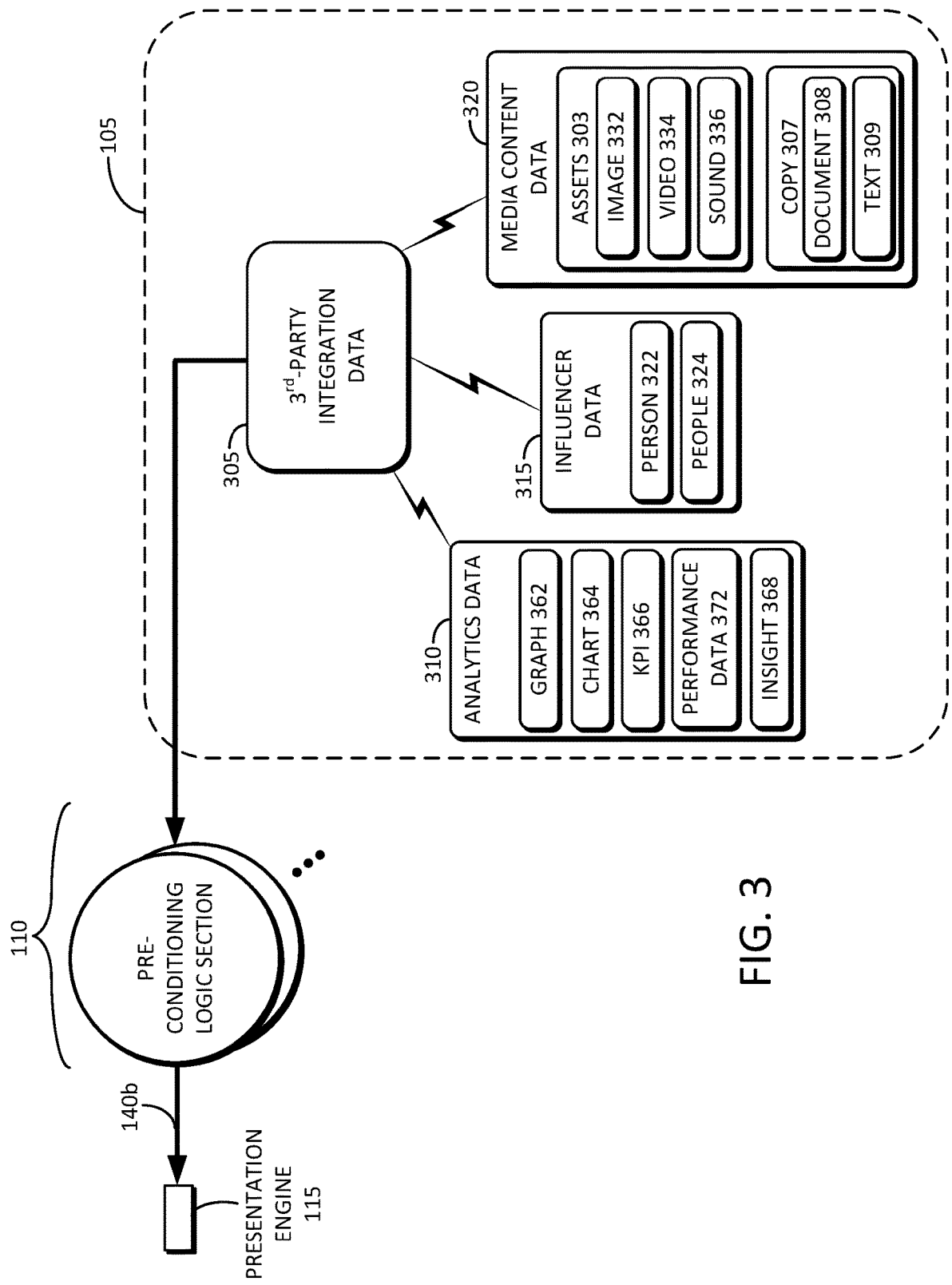
FIG. 3 illustrates an example block diagram of additional details of another portion of the presentation engine input data of FIG. 1, one or more preconditioning logic sections of FIG. 1, and the presentation engine of FIG. 1.

FIG. 3 illustrates an example block diagram of additional details of another portion of the presentation engine input data 105 of FIG. 1. Reference is now made to FIGS. 1 and 3.

The raw presentation engine input data 105 can include 3rd-party integration data 305. The term 3rd-party integration data 305 means information that is collected by an entity that is separate from both of a producer and a consumer of the auto-formatted presentation 125. The 3rd-party integration data 305 can include analytics data 310, influencer data 315, and/or media content data 320. The analytics data 310 can include one or more graphs 362, one or more charts 364, one or more KPIs 366, performance data 372, and/or one or more insights 368. The influencer data 315 can include data or content about a person 322 and/or people 324. For example, the influencer data 315 can include information about influential persons 322 and/or groups of people 324 within a $3^{rd}$ party organization. The term 3rd-party organization means an entity that is separate from both of a producer and a consumer of the auto-formatted presentation

125. The media content data 320 can include media assets 303 and/or media copy 307. The media assets 303 can include, for example, one or more images 332, one or more video clips 334, and/or one or more sound clips 336. The media copy 307 can include, for example, one or more documents 308 and/or one or more text sections 309.

The one or more preconditioning logic sections 110 can receive, pre-configure, and export the 3rd-party integration data 305 to the presentation engine 115 as the pre-configured branding information 140*b*. The presentation engine 115 can receive or otherwise import the pre-configured branding information 140*b*, and can generate the auto-formatted presentation 125 based at least on the pre-configured branding information 140*b* received from the one or more preconditioning logic sections 110. Brands or branding companies can hire 3$^{rd}$ party organizations or agencies to produce branding content. The presentation engine 115 can reduce the amount of manual effort that the 3$^{rd}$ party agency or organization must exert into constructing a presentation of the content.

Figure 4:
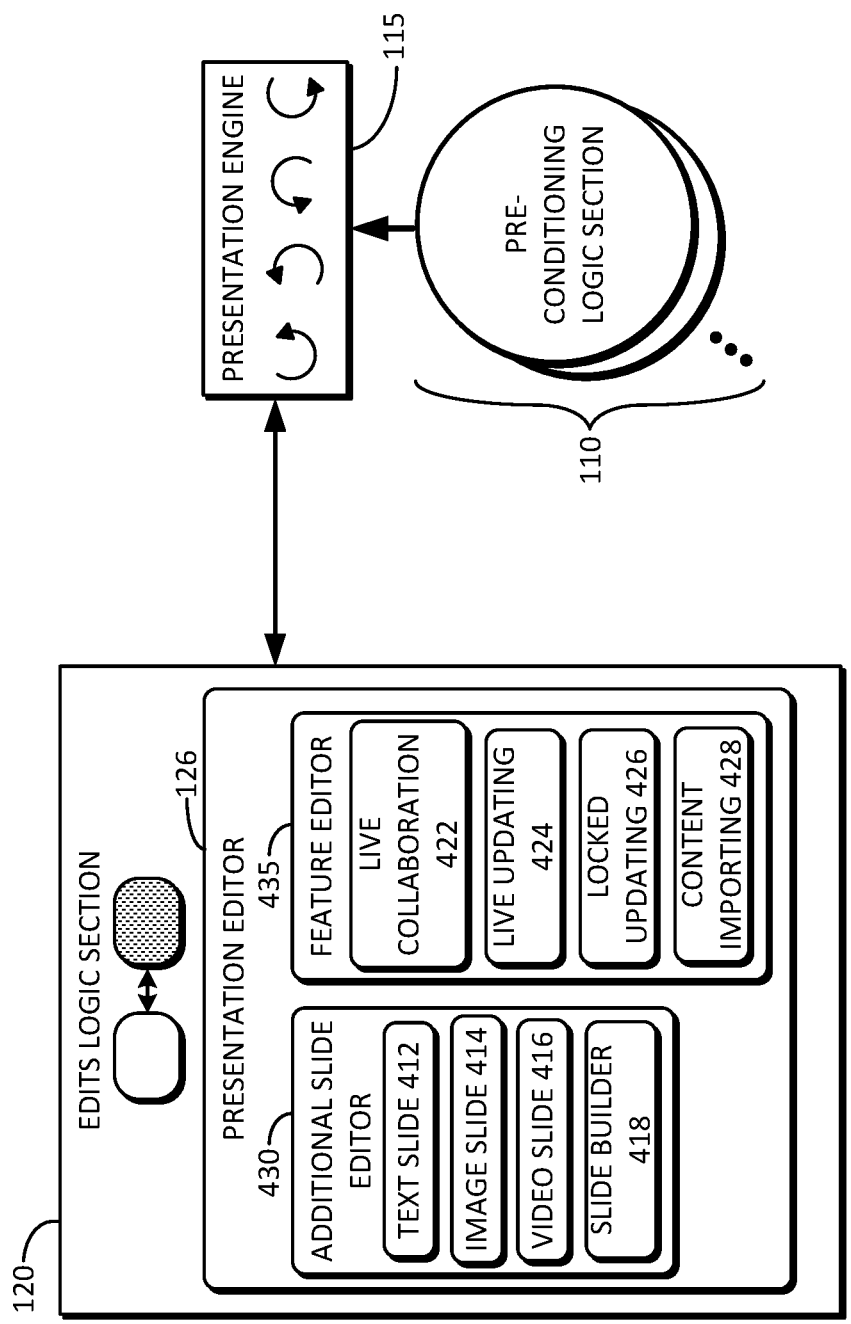
FIG. 4 illustrates an example block diagram of additional details of the edits logic section of FIG. 1, the one or more preconditioning logic sections of FIG. 1, and the presentation engine of FIG. 1.

FIG. 4 illustrates an example block diagram of additional details of the edits logic section 120 of FIG. 1. Reference is now made to FIGS. 1 and 4.

The edits logic section 120 can include the presentation editor 126 for presentation editing. The presentation editor 126 can include an additional slide editor 430 for editing one or more slides. The additional slide editor 430 can include or otherwise provide the ability to edit, for example, one or more text slides 412, one or more image slides 414, and/or one or more video slides 416. The additional slide editor 430 can include one or more slide builders 418 for building one or more slides. It will be understood that the auto-formatted presentation 125 (of FIG. 1) can include one or more slides edited by the additional slide editor 430. Each of the slides can include at least one of the text slide 412, the image slide 414, or the video slide 416, or components thereof.

The presentation editor 126 can include a feature editor 435 for selecting one or more features. For example, the feature editor 435 can provide selections for live collaboration 422, live updating 424, locked updating 426, and/or content importing 428. The live collaboration feature 422 can provide the ability to collaborate in the creation of the auto-formatted presentation 125, substantially in real-time, among multiple administrators (e.g., 130) and/or users (e.g., 135) of the auto-formatted presentation generation system 100. The live updating feature 424 can provide the ability to update, substantially in real-time, edits of the auto-formatted presentation 125 based on updates to the pre-configured branding information (e.g., 140). The locked updating feature 425 can provide the ability to lock one or more portions of the auto-formatted presentation 125 while edits are being made. The locked updating 426 feature provides for updates or edits to the auto-formatted presentation 125 by a particular administrator or user without interference (e.g., unexpected changes or updates) from other administrators (e.g., 130) and/or users (e.g., 135). The content importing 428 feature provides for the importing of content into the auto-formatted presentation 125.

The edits logic section 120 can be accessed and/or controlled by one or more administrator (e.g., 130) and/or one or more users (e.g., 135). Alternatively or in addition, the edits logic section 120 can automatically edit the auto-formatted presentation 125.

Figure 5:
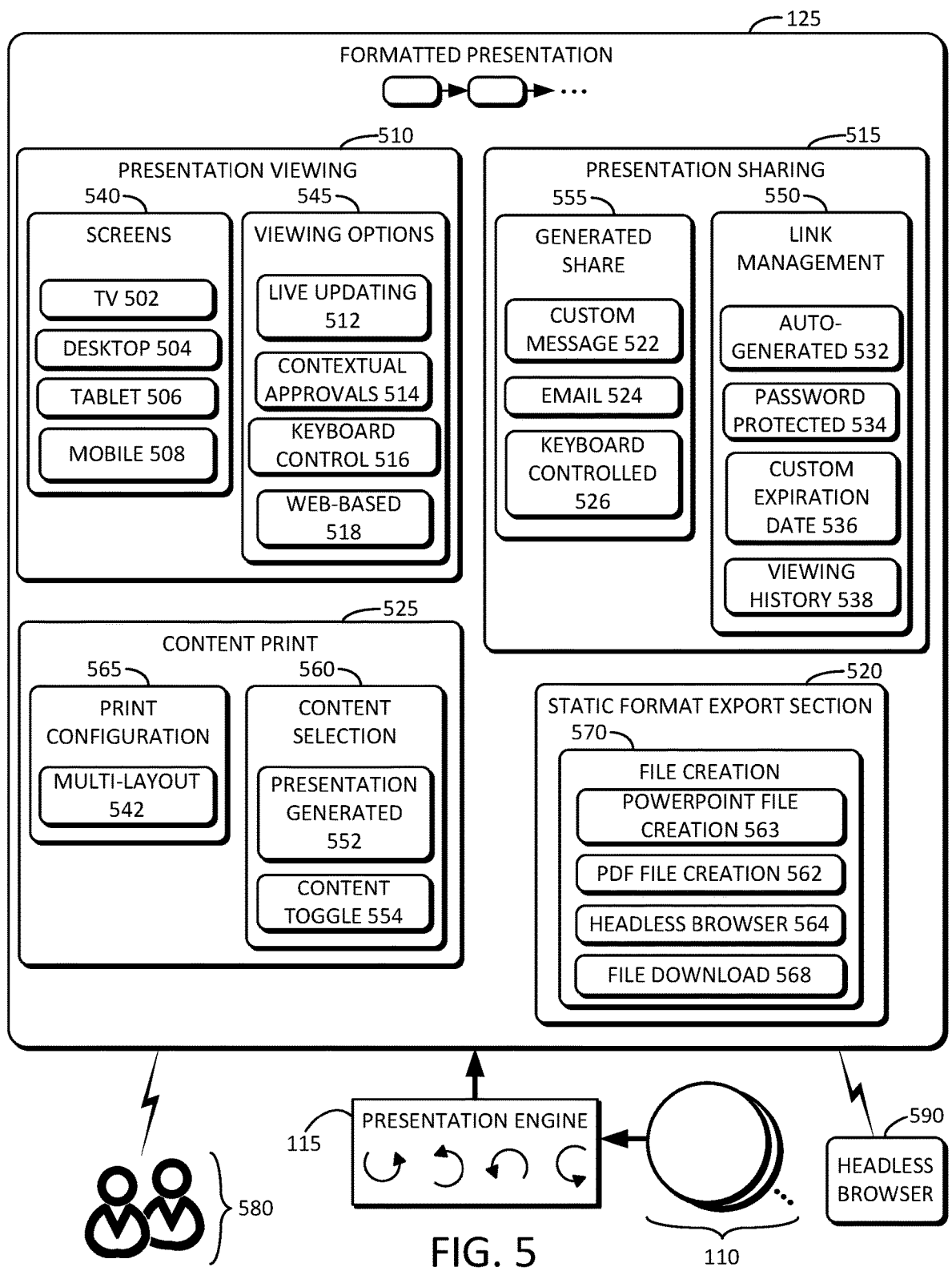
FIG. 5 illustrates an example block diagram of additional details of the formatted presentation FIG. 1, the one or more preconditioning logic sections of FIG. 1, and the presentation engine of FIG. 1.

FIG. 5 illustrates an example block diagram of additional details of the formatted presentation FIG. 1. Reference is now made to FIGS. 1 and 5.

The auto-formatted presentation 125 can take various forms. For example, the auto-formatted presentation 125 can include a presentation viewing mode 510. The presentation viewing mode 510 can include multiple display options of the auto-formatted presentation 125 on one or more screens 540. The one or more screens 540 can include, for example, one or more televisions displays 502, one or more desktop computer displays 504, one or more tablet displays 506, and/or one or more mobile device displays 508, or the like. The presentation viewing mode 510 can include viewing options 545. The viewing options 545 can include a live updating option 512, contextual approvals option 514, keyboard control option 516, and/or web-based control option 518. The live updating option 512 can cause updating, substantially in real time, by the presentation engine 115, of the auto-formatted presentation 125. The contextual approvals option 514 can include or otherwise cause contextual approvals of the auto-formatted presentation 125 by persons having authority such as the administrator (e.g., 130). With the keyboard control option 516, the presentation consumer 580 can control and view (e.g., size, position, print, or the like) the auto-formatted presentation 125 using a keyboard. It will be understood that a mouse or touchpad can be used in place of or in addition to the keyboard. With the web-based control option 518, the auto-formatted presentation 125 can be controlled, displayed, caused to viewed, or the like, by a remote web-based server, remote web-based controller, and/or individual administrator (e.g., 130).

The auto-formatted presentation 125 can include a presentation sharing section 515. The presentation sharing section 515 can include a link management section 550. The link management section 550 can include, for example, one or more auto-generated links 532 to the auto-formatted presentation 125, one or more password protected links 534 to the auto-formatted presentation 125, one or more links having a custom expiration date 536 to the auto-formatted presentation 125, and/or one or more links to a viewing history 538 of the auto-formatted presentation 125. The presentation sharing section 515 can include a generated share section 555. The generated share section 555 can generate one or more custom messages 522 and/or one or more emails 524. In some embodiments, the generated share section 555 can be keyboard controlled 526. In other words, a keyboard can be used to generate the custom message 522 and/or the email 524 of the generated share section 555, which can be transmitted, by the generated share section 555, to the presentation consumer 580, so that the presentation consumer 580 can access and view the auto-formatted presentation 125. It will be understood that a mouse or touchpad can be used in place of or in addition to the keyboard. The presentation sharing section 515 can share the auto-formatted presentation 125 via one or more channels such as web, email, social, or the like.

The auto-formatted presentation 125 can include a static format export section 520. The static format export section 520 can include a file creation section 570 having a power point file creation section 563, which can generate a POWERPOINT® file. The static format export section 520 can include a portable document format (PDF) file creation section 562, which can generate a PDF file for export. The file creation section 570 can generate a PDF file having a headless browser format 564. The PDF file having the headless browser format 564 can be accessed and viewed using a headless browser 590. In some embodiments, the headless browser 590 is a web browser without a graphical user interface. In other words, the headless browser 590 can access web pages but need not show them to any human being. Rather, the headless browser 590 can be used to provide the content of web pages (e.g., the formatted presentation 125) to other programs, systems, or devices. The headless browser 590 can access the static format export section 520 and/or the auto-formatted presentation 125, but need not necessarily display it. Rather, the headless browser 590 can interface with the static format export section 520, or otherwise access information associated with the formatted presentation 125, and forward such accessed information to another program or application. The static format export section 520 can be accessed, transported, and/or downloaded by one or more presentation consumers 580 for convenient viewing of the auto-formatted presentation 125.

The file creation section 570 of the static format export section 520 can include a file download section 568. The file download section 568 can provide the auto-formatted presentation 125 in a downloadable format for convenient download onto a computer device such as a desktop computer, laptop computer, tablet, mobile phone, or the like.

The auto-formatted presentation 125 can include a content print section 525. The content print section 525 can include a content selection section 560. The content selection section 560 can cause the presentation 125 to be generated (e.g., 552) and/or at least a portion of the content within the presentation 125 to be toggled on or off (e.g., 554), or in other words, made visible or not visible. The content print section 525 can include a print configuration section 565, which can have a multi-layout section 542. For example, the print configuration section 565 can receive print configuration input from a user (e.g., 135) or from the presentation consumer 580, which can dictate or otherwise represent how the presentation 125 will appear when physically printed. The multi-layout section 542 can receive layout input from the user, which can dictate or otherwise represent how the presentation 125 is laid out prior to being printed (e.g., multiple slides per print sheet, margin settings, or the like).

Figure 6:
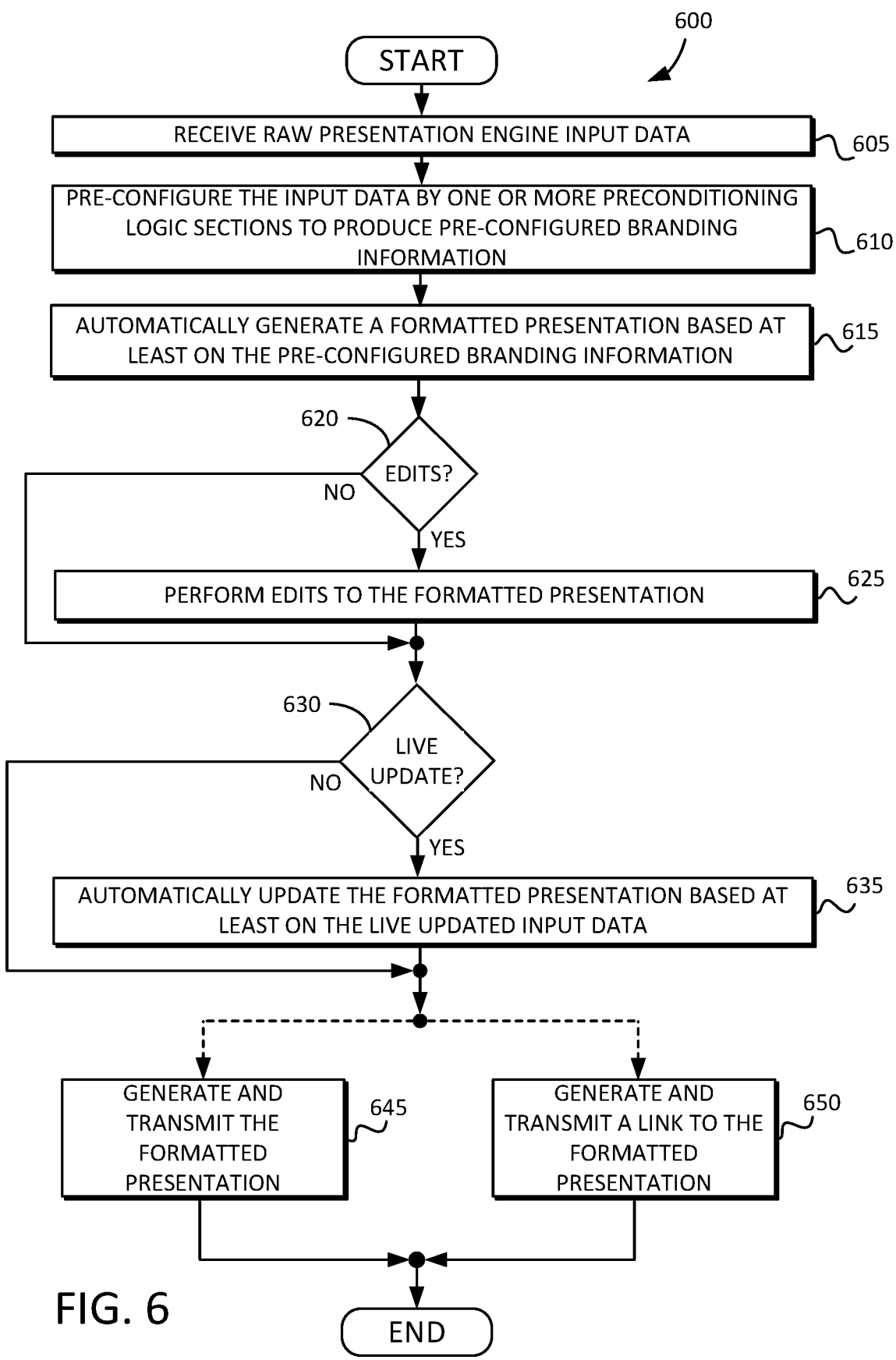
FIG. 6 is an example flow diagram illustrating a technique for auto-generating a presentation in accordance with various embodiments of the inventive concept.

FIG. 6 is a flow diagram 600 illustrating a technique for auto-generating a presentation 125. Reference is now made to FIGS. 1 and 6.

The technique can begin at 605, where raw presentation engine input data 105 can be received. At 610, the received raw input data 105 can be pre-configured by one or more preconditioning logic sections 110 to produce pre-configured branding information 140. At 615, a formatted presentation 125 can be automatically generated, by the presentation engine 115, based at least on the pre-configured branding information 140. The flow proceeds to 620 where a determination can be made whether or not the auto-formatted presentation 125 should be edited. The determination can be made automatically by the presentation engine 115 or manually by intervention of the user. The determination can be based on, for example, whether the auto-formatted presentation 125 exceeds a threshold quality score. If YES, the flow proceeds to 625 where edits can be performed, by the presentation editor 126, to the auto-formatted presentation 125. The edits at 625 can be performed automatically and/or manually as described in detail above.

After the edits are completed, the flow can then proceed to 630. If NO, meaning no edits at 620, the flow can proceed directly to 630, where another determination can be made whether there are live updates to be made (e.g., by the presence or enabling of a live updates option). If YES, the flow can proceed to 635 where the auto-formatted presentation 125 can be automatically updated based at least on the live updated raw input data 105 and/or live updated pre-configured branding information 140. Otherwise, if NO at 630, the updates at 635 are not made. In either case, the flow can then take one or both of paths 645 or 650. Along path 645, the auto-formatted presentation 125 can be generated and transmitted to the presentation consumer (e.g., 580 of FIG. 5). Along path 650, a link to the auto-formatted presentation 125 can be generated and transmitted to the presentation consumer (e.g., 580 of FIG. 5). It will be understood that the steps of the flow diagram illustrated in FIG. 6 can occur in a different order, and/or may have intervening steps between the illustrated steps.

Figure 7:
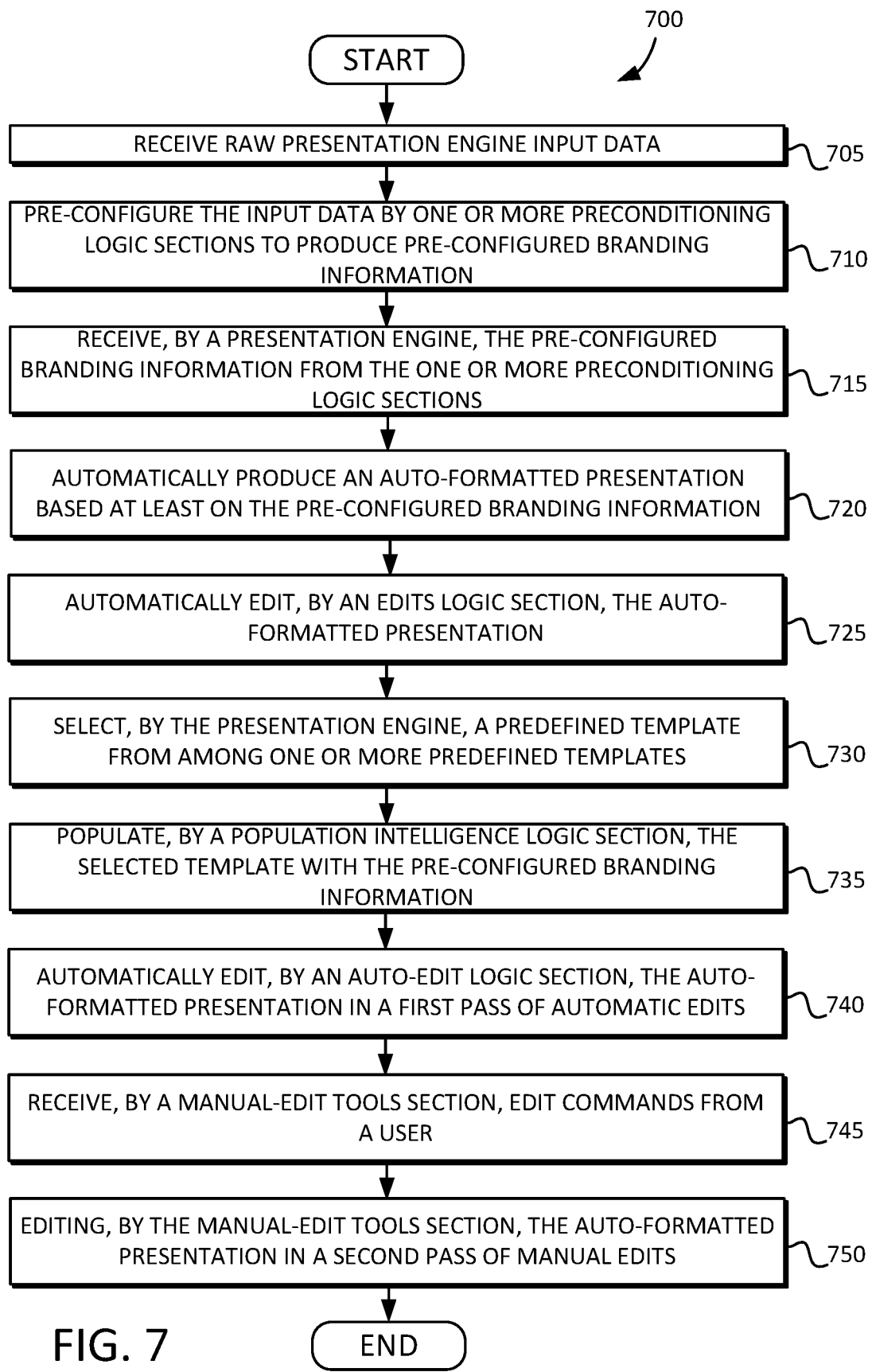
FIG. 7 is another example flow diagram illustrating another technique for auto-generating a presentation in accordance with various embodiments of the inventive concept.

FIG. 7 is another example flow diagram 700 illustrating another technique for auto-generating a presentation in accordance with various embodiments of the inventive concept. The technique can begin at 705, where raw presentation engine input data can be received, by one or more preconditioning logic sections. The raw presentation engine input data can include, for example, at least one of team data, analytics data, workflow data, object data, media content data, or marketing category data. At 710, the one or more preconditioning logic sections can pre-configure the raw input data. For example, the one or more preconditioning logic sections can process the raw presentation engine input data including the team data, the analytics data, the workflow data, the object data, the media content data, and/or the marketing category data. The one or more preconditioning logic sections can automatically produce pre-configured branding information based at least on the processed raw presentation engine input data.

At 715, a presentation engine coupled to the one or more preconditioning logic sections can receive the pre-configured branding information from the one or more preconditioning logic sections. At 720, the presentation engine can automatically produce an auto-formatted presentation based at least on the pre-configured branding information.

At 725, an edits logic section coupled to the presentation engine can automatically edit the auto-formatted presentation. At 730, the presentation engine can select a predefined template from among the one or more predefined templates. At 735, a population intelligence logic section can populate a first portion of the selected template with a first portion of the pre-configured branding information, and a second portion of the selected template with a second portion of the pre-configured branding information.

At 740, an auto-edit logic section of the edits logic section, can automatically control a presentation editor. More specifically, the auto-edit logic section can automatically edit the auto-formatted presentation in a first pass of automatic edits. At 745, a manual-edit tools section of the edits logic section can receive manual edit commands from a user. At 750, the manual-edit tools section can edit the auto-formatted presentation in a second pass of manual edits.

It will be understood that the steps of the flow diagram illustrated in FIG. 7 can occur in a different order, and/or may have intervening steps between the illustrated steps.

Figure 8:
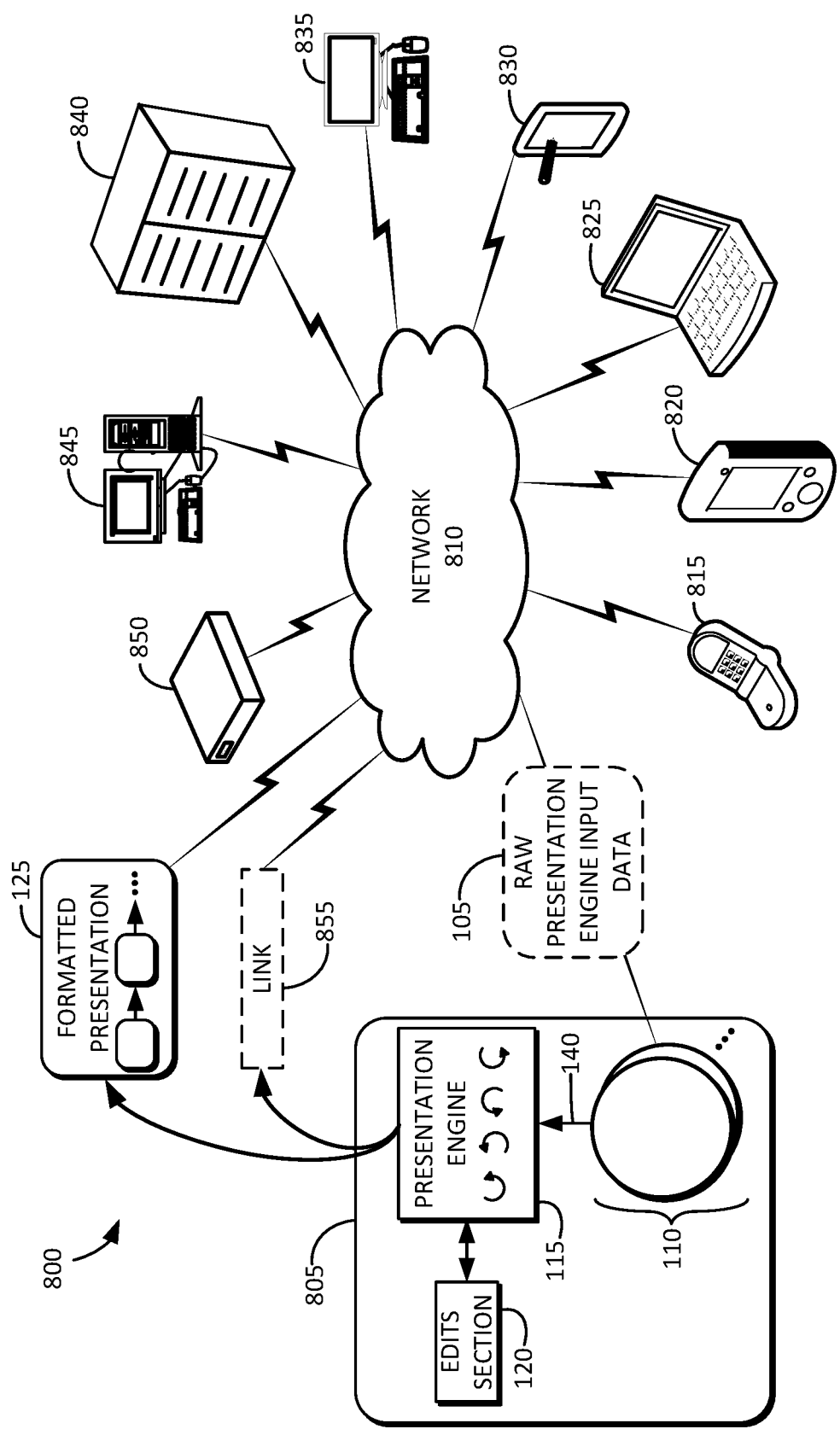
FIG. 8 illustrates a system diagram in accordance with embodiments of the inventive concept.

FIG. 8 illustrates a system diagram 800 in accordance with embodiments of the inventive concept. The system 800 can include a computer server 805. The computer server 805 can include the one or more preconditioning logic sections 110, the presentation engine 115, and/or the edits logic section 120. The computer server 805 can be communicatively coupled to a network 810. The network 810 can be the Internet, a local area network (LAN), a wireless network, a cellular network, or other suitable computer network or cloud. The computer server 805 can receive the raw presentation engine input data 805 from one or more client computing devices over the network 810. The client computing devices can include, for example, a mobile phone 815, a smart phone 820, a laptop computer 825, a tablet 830, a network terminal 835, a database 840, a computer 845, and/or a cloud-based storage device 850. The one or more preconditioning logic sections 110 of the computer server 805 can receive the raw presentation engine input data 105 and pre-configure the data for the presentation engine 115.

The presentation engine 115 can automatically generate the auto-formatted presentation 125 based at least on the pre-configured branding information 140 derived from the raw presentation engine input data 105. The computer server 805 can transmit the auto-formatted presentation 125 and/or a link 855 to the auto-formatted presentation 125 to one or more receiving computing devices (e.g., 815, 820, 825, 830, 835, 840, 845, and/or 850) over the network 510. The receiving computing devices can include for example, the mobile phone 815, the smart phone 820, the laptop computer 825, the tablet 830, the network terminal 835, the database 840, the computer 845, and/or the cloud-based storage device 850. The one or more presentation consumers (e.g., 580 of FIG. 5) may then view the auto-formatted presentation 125 on a receiving computing device. The one or more presentation consumers can include end user consumers, marketing executives, branding partners, internal stakeholders, external stakeholders, or the like.

Auto-import of input data (e.g., marketing and branding content) from a separate and/or integrated application can be performed over a network. The input data can be auto-formatted. A "live" update can be made to the formatted presentation based on latest data from a separate and/or integrated application. A link can be shared for viewing a presentation without the need to have any separate client-side program installed on a user station. A source of digital content can be from a separate and/or integrated application, or from a 3rd-party database. The selected digital content can be exported to a presentation engine, which can automatically produce a presentation such as a slide presentation based on the digital content. The digital content can include a marketing and/or branding plan. The presentation engine can perform a live update to the presentation as the plan changes. The presentation can be viewed in any suitable web browser. Accordingly, marketing and branding plans can be quickly communicated to internal and/or external stakeholders, so that approvals can be obtained to proceed with the corresponding plans.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An auto-formatted presentation generation system, comprising:
   one or more processors and a non-transitory machine-readable memory comprising instructions executable by the one or more processors, the instructions including:

one or more preconditioning logic sections configured to receive raw presentation engine input data, and to automatically produce pre-configured branding information based at least on the raw presentation engine input data;

a presentation engine coupled to the one or more preconditioning logic sections, the presentation engine being configured to receive the pre-configured branding information from the one or more preconditioning logic sections, and to automatically produce an auto-formatted presentation based at least on the pre-configured branding information; and an edits logic section coupled to the presentation engine, the edits logic section being configured to automatically edit the auto-formatted presentation, wherein:

the raw presentation engine input data includes team data, analytics data, workflow data, object data, media content data, and marketing category data;

the one or more preconditioning logic sections are configured to receive and process the raw presentation engine input data including all of the team data, the analytics data, the workflow data, the object data, the media content data, and the marketing category data, and to automatically produce the pre-configured branding information based at least on the processed raw presentation engine input data;

the team data includes object creator data having information about one or more first individuals having a role of creating at least one of an asset or copy for inclusion in the auto-formatted presentation;

the team data further includes approver data having information about one or more second individuals having authority to approve at least one portion of the auto-formatted presentation;

the team data further includes collaborator data having information about one or more third individuals whose responsibility it is to collaborate in the production of at least one portion of the auto-formatted presentation;

the analytics data includes at least one of a graph, a chart, a key performance indicator (KPI), or an insight;

the workflow data includes one or more approvals indicating whether an individual from among the one or more second individuals approves of at least one portion of the auto-formatted presentation;

the object data includes one or more moments, each of the one or more moments being associated with a particular slide or section of the auto-formatted presentation, each of the one or more moments including a marketing tease about a particular product or service, each of the one or more moments being associated with a particular release date;

the media content data includes at least one of an image, a video clip, a sound clip, or a document;

the marketing category data includes at least one of a social media reference, a link to a website, an article, or an email;

the marketing category data includes at least one of a press release, a banner ad, retail store information, or advertising information;

the one or more preconditioning logic sections are configured to receive and process (i) the object creator data, (ii) the approver data, (iii) the collaborator data, (iv) the at least one of the graph, the chart, the key performance indicator (KPI), or the insight, (v) the one or more approvals, (vi) the one or more moments, (vii) the at least one of the image, the video clip, the sound clip, or the document, and (viii) the at least one of the press release, the banner ad, the retail store information, or the advertising information, and to automatically produce the preconfigured branding information based at least on said received and processed raw presentation input data, and wherein the auto-formatted presentation comprises a portable document format (PDF) export section including a file creation section configured to generate a PDF file for export; and the PDF file includes a headless browser format for access by a headless browser.

2. The auto-formatted presentation generation system of claim 1, wherein the presentation engine comprises:

one or more predefined templates, wherein the presentation engine is configured to select a predefined template from among the one or more predefined templates; and a population intelligence logic section configured to populate a first portion of the selected template with a first portion of the pre-configured branding information, and to populate a second portion of the selected template with a second portion of the pre-configured branding information.

3. The auto-formatted presentation generation system of claim 2, wherein the edits logic section comprises:

a presentation editor; and an auto-edit logic section configured to automatically control the presentation editor to edit the auto-formatted presentation within parameters of the selected template.

4. The auto-formatted presentation generation system of claim 3, wherein the edits logic section further comprises:

a manual-edit tools section including a user interface configured to receive commands from a user to manually edit the auto-formatted presentation, and to cause the presentation editor to edit the auto-formatted presentation within parameters of the selected template.

5. The auto-formatted presentation generation system of claim 4, wherein:

the presentation engine is configured to automatically select the predefined template from among the one or more predefined templates based at least on the pre-configured branding information;

the auto-edit logic section is configured to automatically control the presentation editor to edit the auto-formatted presentation in a first pass of automatic edits; and the manual-edit tools section is configured to receive commands from the user to manually edit the auto-formatted presentation in a second pass of manual edits.

6. The auto-formatted presentation generation system of claim 1, wherein:

the one or more preconditioning logic sections are configured to receive and process the raw presentation engine input data including 3 party integration data, and to automatically produce the pre-configured branding information based at least on the processed raw presentation engine input data;

the 3rd party integration data includes the analytics data having at least one of the graph, the chart, the key performance indicator (KPI), performance data, or the insight;

the 3rd party integration data includes influencer data having information about an influential person or group of people within a 3rd party organization; and the 3rd party integration data includes the media content data having at least one of the image, the video clip, or the sound clip.

7. The auto-formatted presentation generation system of claim 1, wherein: the edits logic section includes a presentation editor having an additional slide editor and
a feature editor;
the additional slide editor is configured to edit one or more text slides, one or more image slides, and one or more video slides;
the feature editor is configured to provide live collaboration, substantially in real-time, among a plurality of administrators or users in creation of the auto-formatted presentation;
the feature editor is configured to provide live updates, substantially in real-time, of edits of the auto-formatted presentation based on updates to the pre-configured branding information; and
the feature editor is configured to provide locked editing of the auto-formatted presentation by a particular administrator or user without interference from other administrators or users from among the plurality of administrators or users.

8. The auto-formatted presentation generation system of claim 1, wherein: the auto-formatted presentation comprises a presentation viewing mode including (i) a plurality of display options of the auto-formatted presentation on one or more screens, and (ii) viewing options;
the one or more screens include at least one of a television display, a computer display, a tablet display, or a mobile device display;
the viewing options include a live updating option in which the presentation engine is configured to update, substantially in real time, the auto-formatted presentation;
the viewing options include a keyboard control option in which a presentation consumer is able to control the auto-formatted presentation using a keyboard; and
the viewing options include a web-based control option in which a remote web-based controller is able to control the auto-formatted presentation.

9. The auto-formatted presentation generation system of claim 1, wherein:
the auto-formatted presentation comprises a presentation sharing section including a link management section and a generated share section;
the link management section includes at least one of an auto generated link to the auto formatted presentation, a password protected link to the auto-formatted presentation, a link having a custom expiration date to the auto-formatted presentation, or a link to a viewing history of the auto-formatted presentation; and
the generated share section is configured to generate and transmit one or more custom messages to a presentation consumer so that the presentation consumer can access and view the auto-formatted presentation.

10. The auto-formatted presentation generation system of claim 1, wherein: the auto-formatted presentation comprises a content print section including a content selection section and a print configuration section;
the content selection section is configured to cause at least a portion of the auto-formatted presentation to be toggled on as visible, or to be toggled off as not visible; and
the print configuration section is configured to receive print configuration input representing how the auto-formatted presentation appears when physically printed.

11. The auto-formatted presentation generation system of claim 1, wherein: the auto-formatted presentation comprises a presentation sharing section including a link management section and a generated share section;
the link management section includes an auto-generated link to the auto-formatted presentation; and
the generated share section is configured to generate and transmit one or more custom messages including the auto-generated link to a presentation consumer so that the presentation consumer can access and view the auto-formatted presentation.

12. The auto-formatted presentation generation system of claim 1, wherein: the pre-configured branding information includes timestamps that fall within a selected date range; and
the edits logic section is configured to automatically edit the auto-formatted presentation only using the pre-configured branding information having the timestamps that fall within the selected date range.

13. The auto-formatted presentation generation system of claim 1, wherein: the edits logic section is configured to resize the image;
the edits logic section is configured to reformat the image; and the edits logic section is configured to re-arrange the pre-configured branding information in the auto-formatted presentation.

\* \* \* \* \*